(12) United States Patent
Filsfils et al.

(10) Patent No.: US 12,206,573 B2
(45) Date of Patent: Jan. 21, 2025

(54) NETWORK PATH DETECTION AND MONITORING

(71) Applicant: Cisco Technology, Inc., San Jose, CA (US)

(72) Inventors: Clarence Filsfils, Brussels (BE); Ahmed Mohamed Ahmed Abdelsalam, L'Aquila (IT); Rakesh Gandhi, Stittsville (CA); Jisu Bhattacharya, San Jose, CA (US); Pablo Camarillo Garvia, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 380 days.

(21) Appl. No.: 17/691,016

(22) Filed: Mar. 9, 2022

(65) Prior Publication Data

US 2023/0164063 A1   May 25, 2023

Related U.S. Application Data

(60) Provisional application No. 63/281,262, filed on Nov. 19, 2021.

(51) Int. Cl.
*H04L 45/24*   (2022.01)
*H04L 43/10*   (2022.01)
(Continued)

(52) U.S. Cl.
CPC ............ *H04L 45/24* (2013.01); *H04L 43/10* (2013.01); *H04L 45/02* (2013.01); *H04L 45/26* (2013.01); *H04L 45/507* (2013.01); *H04L 47/32* (2013.01)

(58) Field of Classification Search
CPC ......... H04L 45/00; H04L 45/02; H04L 45/24; H04L 45/26; H04L 45/50; H04L 45/507;
(Continued)

(56) References Cited

U.S. PATENT DOCUMENTS 9,094,323 B2 * 7/2015 Frost ..................... H04L 43/12
9,197,588 B2 * 11/2015 Chen ..................... H04L 51/04
9,369,380 B1 * 6/2016 Singh ................. H04L 67/1001
(Continued)

FOREIGN PATENT DOCUMENTS

WO    WO2017168204 A1    5/2017

OTHER PUBLICATIONS

PCT Search Report and Written Opinion mailed Feb. 17, 2023 for PCT application No. PCT/US2022/049871, 18 pages.

*Primary Examiner* — Kevin D Mew
(74) *Attorney, Agent, or Firm* — Lee & Hayes, P.C.

(57) ABSTRACT

This disclosure describes techniques for detecting and monitoring paths in a network. The techniques include causing a source node to generate probe packets to traverse a multi-protocol label switching (MPLS) network, for instance. In some examples, the probe packets include entropy values that correspond to individual equal-cost multi-path (ECMP) paths of the network. The probe packets may be received at an SDN controller from a sink node after traversing the network. Analysis of the probe packets allow path discovery and mapping of the entropy values to ECMP paths. The mapping of discovered paths may be used for optimization of network monitoring activities, including second subsequent probe packets over particular ECMP paths based on the mapped entropy values.

20 Claims, 9 Drawing Sheets

(51) Int. Cl.
  *H04L 45/00* (2022.01)
  *H04L 45/02* (2022.01)
  *H04L 45/50* (2022.01)
  *H04L 47/32* (2022.01)
(58) Field of Classification Search
  CPC ....... H04L 43/10; H04L 43/106; H04L 43/12; H04L 47/32
  See application file for complete search history.

(56) References Cited

U.S. PATENT DOCUMENTS

| | | | | |
|---|---|---|---|---|
| 9,608,858 | B2* | 3/2017 | Asati | ........................ H04L 69/40 |
| 9,912,598 | B2* | 3/2018 | Wu | ......................... H04L 45/24 |
| 2015/0003255 | A1* | 1/2015 | Frost | ........................ H04L 45/24 |
| | | | | 370/238 |
| 2015/0030020 | A1* | 1/2015 | Kini | ........................ H04L 45/28 |
| | | | | 370/389 |
| 2015/0109907 | A1* | 4/2015 | Akiya | .................... H04L 47/125 |
| | | | | 370/229 |
| 2015/0188798 | A1* | 7/2015 | Mizrahi | ................ H04L 45/245 |
| | | | | 370/252 |
| 2016/0020941 | A1 | 1/2016 | Asati et al. | |
| 2018/0062990 | A1* | 3/2018 | Kumar | .................... H04L 45/70 |
| 2018/0176134 | A1* | 6/2018 | Pignataro | ................ H04L 67/10 |
| 2018/0278510 | A1* | 9/2018 | Iqbal | .................... H04L 47/125 |
| 2019/0199636 | A1 | 6/2019 | Narayanan | |
| 2021/0111992 | A1 | 4/2021 | Nagendra et al. | |
| 2021/0119930 | A1 | 4/2021 | Debbage et al. | |
| 2021/0160173 | A1* | 5/2021 | Biradar | ............... H04L 43/0841 |
| 2022/0141131 | A1* | 5/2022 | Rajamanickam | ..... H04L 45/123 |
| | | | | 370/252 |
| 2022/0329518 | A1* | 10/2022 | Filsfils | .................. H04L 45/507 |

* cited by examiner

NETWORK PATH DETECTION AND MONITORING

RELATED APPLICATIONS

This application claims priority to U.S. Provisional Application No. 63/281,262, filed on Nov. 19, 2021, the entire contents of which are incorporated herein by reference.

TECHNICAL FIELD

The present disclosure relates generally to detection and monitoring of computing network paths, thereby improving management and performance of the network.

BACKGROUND

Network environments are growing in complexity and scale to handle the ever-increasing demands on computer systems in the modern world. Cloud computing may be used to provide computing resources without users having to invest in and maintain their own computing infrastructure. Cloud computing often involves the use of networks of data centers which house servers, routers, and other devices that provide computing resources to users such as computing resources, networking resources, storage resources, database resources, application resources, and so forth. Users may be allocated portions of the computing resources using virtualization technology that remain available for peak demands of the users. The virtualized portions, or virtualized networks, of computing resources may be scaled up (or down) according to the computing needs of a given user without the need to maintain excess computing capacity. An example may include a multi-protocol label switching (MPLS) network, and management of the flexible, virtualized network may be performed by software-defined networking (SDN). Operators may rely on equal-cost multi-path (ECMP) routing in any given MPLS network. In a relatively large and complex network, potentially thousands of ECMP paths may exist between certain provider edge nodes (PEs).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
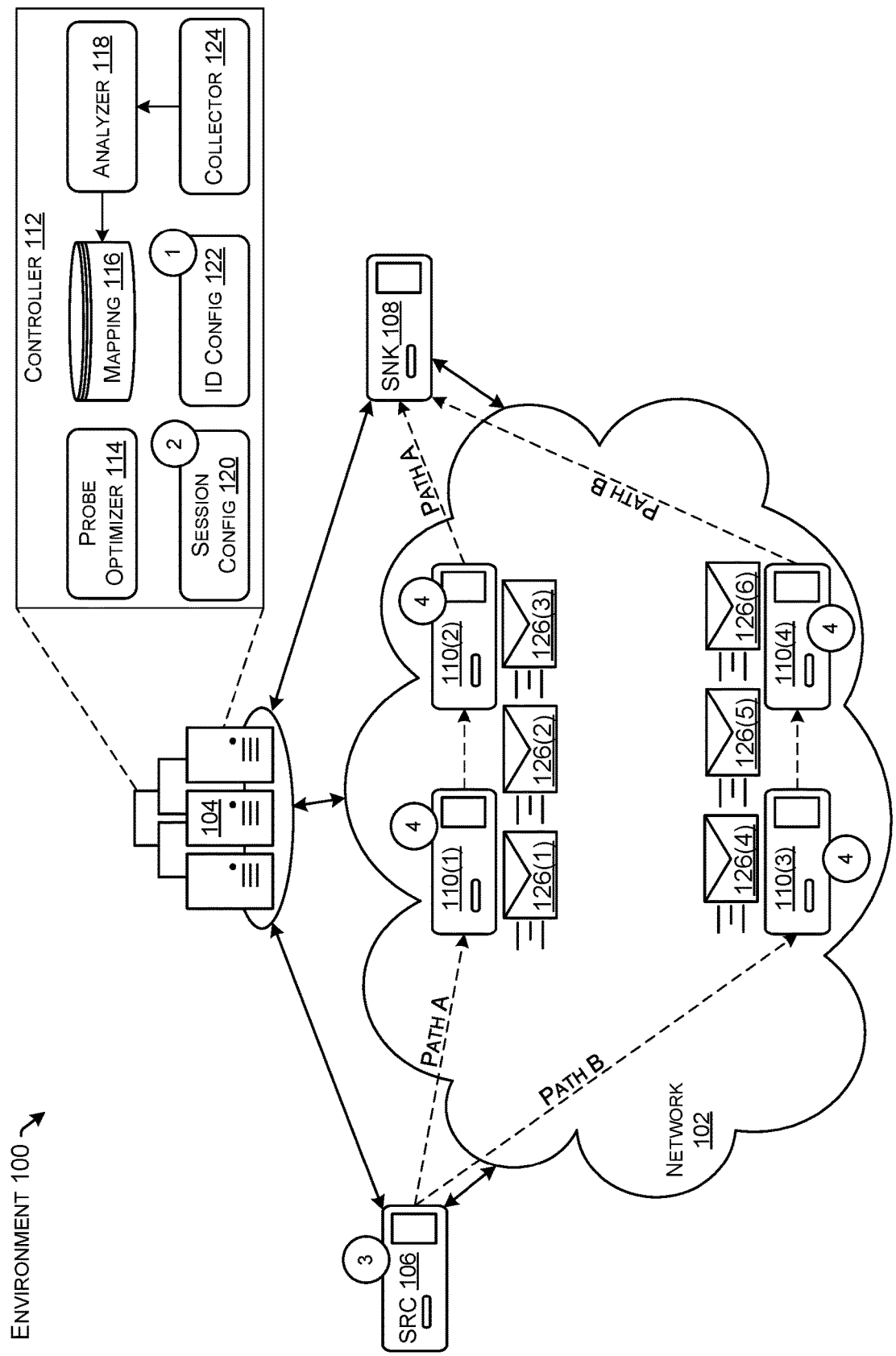
FIGS. 1A-1C illustrate component diagrams with an example environment in which network path detection and monitoring may be employed as part of communications between network devices, in accordance with the present concepts.

This disclosure describes, at least in part, a method that may be implemented by a controller device communicatively coupled to multiple nodes in a network. The method may include provisioning, by a controller, the multiple nodes of a network to conduct a path tracing session using probe packets. The multiple nodes may include a source node, a midpoint node, and a sink node, for instance. The provisioning may include causing the source node to generate an individual probe packet to traverse an equal-cost multi-path (ECMP) path through the network. In some examples, the individual probe packet may have a header that includes an entropy value corresponding to the ECMP path. The ECMP path may include the midpoint node. The provisioning may further include causing the midpoint node to record path tracing information in the individual probe packet. The provisioning may also include causing the sink node to forward the individual probe packet to the controller. The sink node may forward the individual probe packet to the controller after the individual probe packet has traversed the ECMP path, for instance. The method may also include analyzing the path tracing information to produce a mapping of the entropy value to the ECMP path. Furthermore, the method may include using the mapping to cause the source node to generate a subsequent probe packet to traverse the ECMP path through the network.

This disclosure also describes, at least in part, another method that may be implemented by a controller device communicatively coupled to multiple nodes in a network. The method may include causing a source node to generate a first probe packet to traverse a multi-protocol label switching (MPLS) network. The first probe packet may include a first entropy value. The method may include causing one or more midpoint nodes of the MPLS network to record path tracing information in the first probe packet. The method may also include receiving the first probe packet from a sink node after the first probe packet has traversed the MPLS network via at least one of the midpoint nodes. The method may also include analyzing the path tracing information to discover an ECMP path that the first probe packet traversed across the MPLS network. The method may further include producing a first entropy-to-path mapping of the first entropy value to the ECMP path. Additionally, the method may include using the first entropy-to-path mapping to monitor the ECMP path by causing the source node to produce a subsequent probe packet that includes the first entropy value.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for detecting and monitoring of paths in a computing network. For example, data may be sent from a source node to a sink node by any one of multiple paths (e.g., data paths) across the network. Path tracing may be used to discover a particular path used to send the data between the source node and sink node. Discovery of the particular path may provide valuable information for managing the network, such as delay times between source node and sink node, hop-by-hop travel time information relative to midpoint nodes along the path, load and/or resource consumption for the associated nodes, and/or other path characteristics. In some networks, any given source node and sink node pair may have a relatively large number of potential unknown paths. The present techniques include methods for detecting potential paths and gathering information related to path characteristics. The techniques also include methods for optimizing the ongoing monitoring of the detected paths to help manage complex networks.

In some examples, network operators may use equal-cost multi-path (ECMP) routing to efficiently transfer data across a network. The network fabric may include multi-protocol label switching (MPLS), segment routing (SR)-MPLS, IPv6/SRv6, etc. However, ECMP routing may involve a relatively large number of paths across a network, which may be difficult to manage. For instance, more ports and/or line cards may be added to the network to increase bandwidth capacity. As the number of ports and/or line cards increases, the number of available ECMP paths between two nodes (e.g., provider edges (PEs)) may also increase. In a relatively large and complex network, potentially thousands of ECMP paths may exist between certain PEs. In one example, a network may include 32K ECMP paths between PEs. Monitoring and troubleshooting such an enormous number of ECMP paths may be difficult or impossible to accomplish manually in a timely fashion. Therefore, an automated solution for detection and monitoring of paths may be advantageous.

Using the techniques described herein, a controller may be used to discover ECMP paths in a MPLS/SR-MPLS network. The controller may be a software-defined networking (SDN) controller, for instance. The controller may be configured to detect paths by analyzing information in packets sent across the network. Information contained in any given packet may include information related to the path that the packet is intended to traverse and/or a path the packet has already traveled. Information may be contained in a header (e.g., MPLS header) and/or encapsulation of the packet, for instance. In some implementations, the controller may allocate flags in probe packets generated as part of a path tracing (PT) session configured on the source node. An example of a flag includes a path tracing indicator (PTI), which may be placed in entropy label control (ELC) bits of a structured entropy label (SEL), for instance. The PTI flag may be used to trigger PT behavior at midpoint nodes to record the path tracing data (e.g., interface IDs, timestamps, interface load) in the probe packets. Path detection and monitoring techniques may also include generation of an MPLS label for a probe packet that supports the PT session. For instance, a timestamp, encapsulate, and forward (TEF) MPLS label may be used to trigger PT behavior at a sink node to forward the probe packets to a collector (e.g., collector module), which may be associated with and/or part of the controller. The sink node may forward the probe packets after recording relevant PT data of the sink node and/or adding a new encapsulation, in some cases. The sink node may forward the probe packet and/or relevant information to the collector/controller via data plane forwarding (e.g., in fast path). The controller may be able to discover the path that the probe packet took across the network by analyzing information in a header, in a TLV after the header, and/or in an encapsulation of the probe packet, for example.

Additionally, the SEL values included in probe packets may be unique. For instance, a particular entropy value may trigger a probe packet to travel by a particular path between a source/sink node pair. Stated another way, a first path between a source/sink node pair may be associated with a first entropy value, while a second path between the same source/sink node pair may be associated with a second entropy value. When the controller analyzes the entropy values contained in packets that have been sent across the network, the controller may learn which entropy value corresponds to a particular path. Therefore, the controller may be able to use an entropy value that is mapped to a particular detected path in a subsequent probe packet, triggering transmission of the subsequent probe packet over the same particular detected path. In this manner, the controller can use the collected information to continue to monitor the discovered paths in the network. The present techniques include methods to ensure that the entropy values or other important information is not removed at a midpoint node or at the sink node, so that the information may be collected intact.

The present techniques also include methods to improve efficiency of the ongoing path monitoring. Consider an example scenario in which one thousand ECMP paths exist between a source/sink node pair. In order to discover the potential paths across a network that might be used for data transfer from the source node to the sink node, the controller may send out ten thousand probe packets with distinguishable SEL/entropy values. Once the probe packets are collected by the collector, the controller may detect a significant portion (or even all) of the one thousand ECMP paths. Further, the controller may map the entropy values to the detected ECMP paths. Therefore, the controller may be able to select a subset of the original ten thousand entropy values that returned valid ECMP paths. The selected entropy values may then be used in subsequent probe packets, to trigger transmission across and monitoring of known paths. The mapping of entropy values to detected paths is therefore helpful toward optimizing a solution in which a (potentially) minimum amount of probe packets are needed to monitor the network, rather than continuing to sweep a large entropy value range.

To summarize, the present techniques provide an automated solution for detection and monitoring of ECMP paths by a controller. For instance, an SDN controller with access to a MPLS/SR-MPLS or IPv6/SRv6 network may generate probes with different entropy values. The techniques may ensure that the entropy value is preserved in the probe packet as it travels across the network to the SDN controller. The SDN controller may leverage mapping of entropy values from collected probes to potentially optimize a number of probes generated to monitor the ECMP paths. As such, the present techniques may significantly increase the efficiency of monitoring a complex and growing network.

Although the examples described herein may refer to a controller and/or certain types of nodes, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
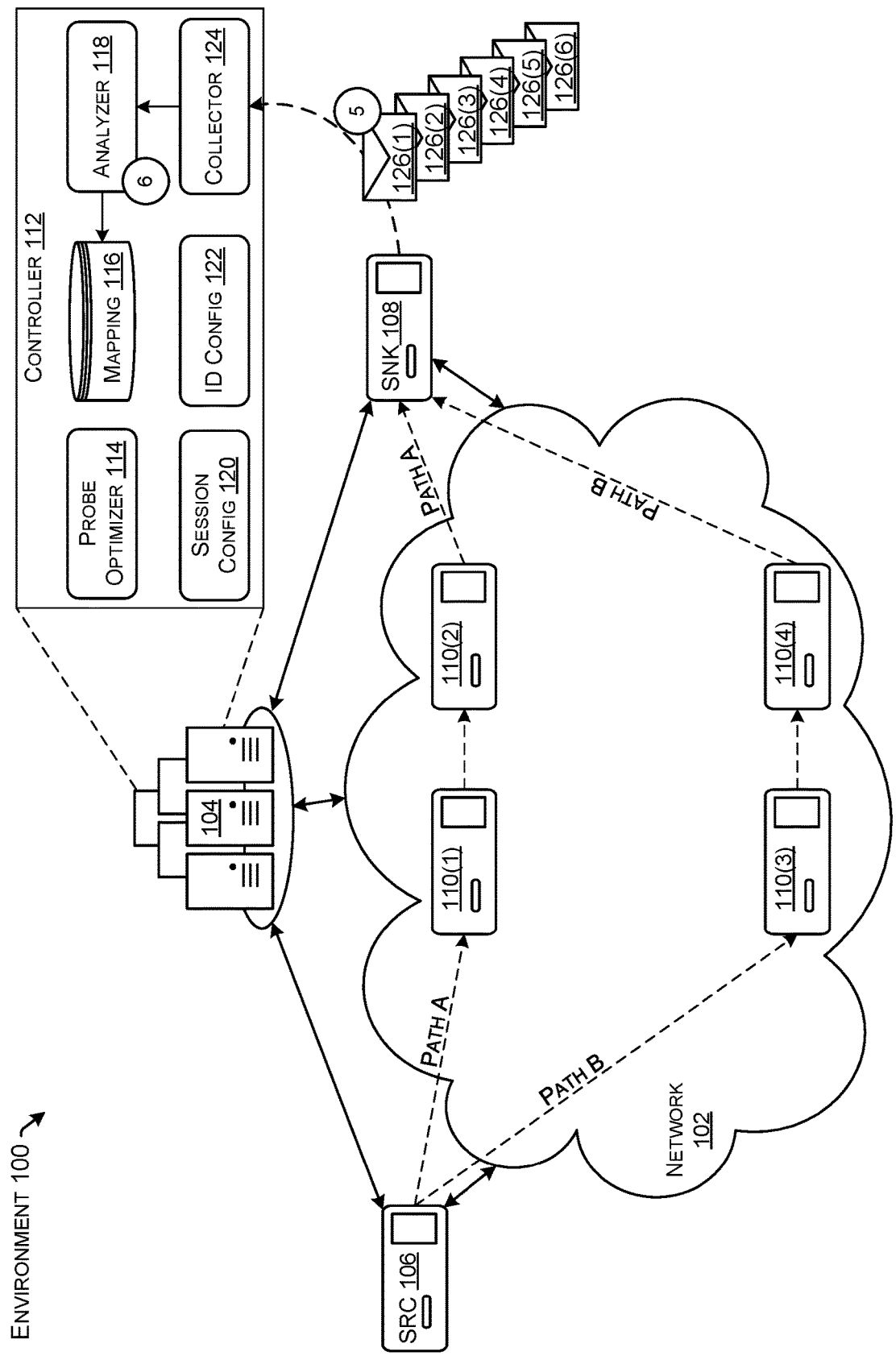
Figure 1C:
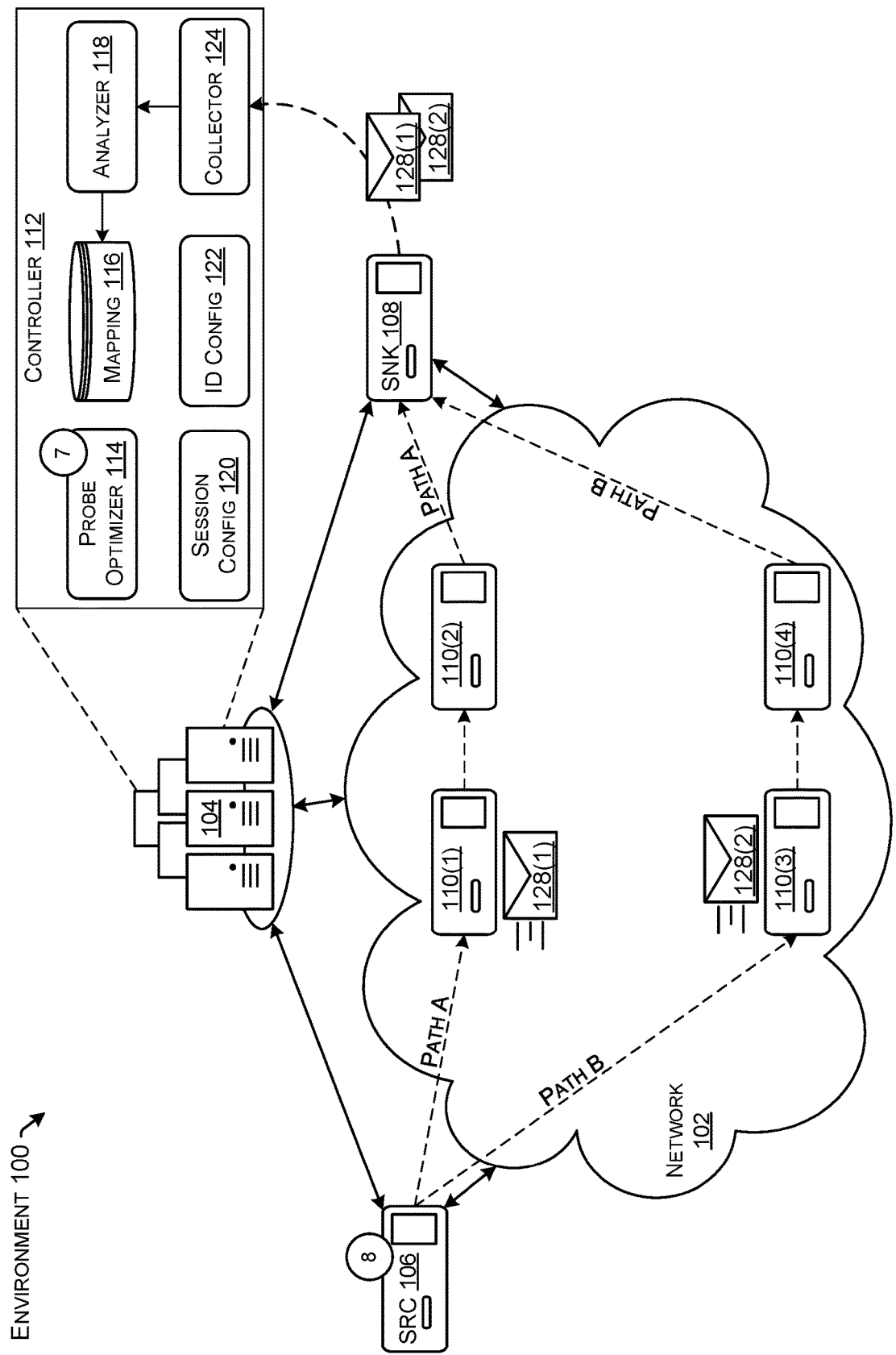

FIGS. 1A-1C collectively illustrate an example environment 100 in accordance with the present path detection and monitoring concepts. Example environment 100 may include a network 102, one or more servers 104, at least one source node 106, at least one sink node 108, and midpoint devices 110. In some cases, parentheticals and/or letters are utilized after a reference number to distinguish like elements. Use of the reference number without the associated parenthetical is generic to the element. For instance, FIG. 1A depicts four midpoint nodes 110, including midpoint node 110(1), midpoint node 110(2), midpoint node 110(3), and midpoint node 110(4).

Server 104 may be communicatively coupled to various other devices, such as source node 106, sink node 108, and/or other devices of the network 102. Note that in addition to midpoint nodes 110, server 104, source node 106, and sink node 108 may also be considered part of network 102, in some examples. Within example environment 100, server 104, source node 106, sink node 108, midpoint nodes 110, and/or other devices may exchange communications (e.g., packets) via a network connection(s) of network 102, some of which are indicated by double arrows. For instance, network connections may be transport control protocol (TCP) network connections or any network connection (e.g., information-centric networking (ICN)) that enables server 104 to exchange packets with other devices via cloud computing network 102. The network connections represent, for example, data paths between server 104 and source node 106 and/or sink node 108. It should be appreciated that the term "network connection" may also be referred to as a "network path." The use of a cloud computing network in this example is not meant to be limiting. Other types of networks are contemplated in accordance with path detection and monitoring concepts.

As shown in FIGS. 1A-1C, the one or more servers 104 may include a controller 112. Controller 112 may consist of a probe optimizer 114, a mapping database 116, an analyzer 118, a session configuration module 120, an ID configuration module 122, a collector module 124, and/or other components. The function of at least some of the components of controller 112 will be described in more detail relative to FIGS. 1B and 1C, below. Note that controller 112 may be manifest on more than one computing device. For instance, different modules/components of controller 112 may be located on different devices and/or be physically located at different locations associated with the one or more servers 104.

FIGS. 1A-1C also depict multiple paths across network 102, and probe packets 126 that may be sent via the paths across network 102. Two paths across network 102 are depicted, including "Path A," which originates at source node 106, passes through midpoint nodes 110(1) and 110(2), and arrives at sink node 108. "Path B" originates at source node 106, passes through midpoint nodes 110(3) and 110(4), and arrives at sink node 108. Path A and Path B may be considered simplistic examples of ECMP paths in a MPLS/SR-MPLS network. As introduced above, there may be a relatively large number (e.g., 1000) of paths between any given source node and sink node. In general, it is to be understood that the scenario depicted in FIGS. 1A-1C is a simplified example for purposes of explanation.

FIGS. 1A-1C show several steps, indicated with circled numbers, that are examples of functions performed by and/or communications between the devices of environment 100. The functions and/or communications may relate to an example path detection and/or monitoring scenario associated with environment 100, such as path detection and monitoring of network 102. For example, referring to FIG. 1A, at "Step 1," controller 112 may provision the nodes in network 102, including the source node 106, sink node 108, and midpoint nodes 110. In some implementations, provisioning of the nodes in network 102 by controller 112 may include the following functions performed by ID configuration module 122 of controller 112. ID configuration module 122 may compute an interface ID for some or all interfaces in network 102, which may be at least partially based on a network topology of network 102. Further, ID configuration module 122 may configure the interface IDs on the interfaces of the nodes in network 102, including on source node 106, sink node 108, and/or midpoint nodes 110.

At "Step 2," session configuration module 120 may initiate path detection for network 102 by configuring a path tracing (PT) session. A variety of parameters may be identified by session configuration module 120 for the purpose of initiating the PT session. The parameters may be generated and/or computed by session configuration module 120 and/or another component of controller 112. The parameters may be used by source node 106 to generate one or more probe packets for the PT session. Several example parameters are provided here, and further detail for some parameters is described in more detail relative to FIG. 2A, below. A session ID identifies the particular PT session that is being initiated. A probe rate represents a desired number of probe packets per second to generate as part of the PT session. An MPLS Segment Routing (SR) Segment Identifier (SID) list may be part of information included in a probe packet header. A traffic class may be identified for the probe packet, such as a Traffic Class (TC) and/or DSCP value. A TTL value may be encoded in the SR-MPLS transport labels. An MPLS Hop-by-Hop PT (HbH-PT) header size may be identified, specifying a size of the header to be inserted in the probe packet related to collecting PT data from midpoint nodes 110. Another example parameter is an MTU sweeping range. In an instance where an MTU sweeping range is set, a payload may be included in a probe packet to test different packet sizes. The payload may be included in the end of the probe packet, for instance. The MTU sweeping range may be indicated as a list of specific packet sizes, or as a size increment(s).

Several example parameters determined by session configuration module 120 to initiate the PT session may be related to the structured entropy label (SEL) values that may be used with the probe packets. An entropy sweeping range may be specified, referring to a range of entropy values to scan. In some examples, the entropy sweeping range may be defined by a starting entropy label value (ELs) and/or an ending EL value (ELe), where ELs may be less than or equal to ELe. In some examples, sweeping of the entropy value range may be based on a random value in the range. In other examples the sweeping may be incremental, specified as a step value, for instance. Furthermore, a number of different entropy values to scan may be specified. As suggested above, controller 112 may have no a-priori knowledge of the entropy-to-path mapping within network 102. Hence, session configuration module 120 may use a relatively large range of entropy values to sweep (e.g., from 8 to 8192) to potentially detect all paths.

At "Step 3," source node 106 may generate probe packets 126 and send them into network 102. Controller 112 may send instructions to source node 106 to generate one or more probe packets 126, for instance. The controller 112 may also provide the parameters identified by session configuration module 120 to source node 106 for generation of the probe packets 126. The source node 106 may have no prior knowledge on the number of probes needed to measure the available paths to the sink node 108. In FIG. 1A, source node 106 is shown sending six probe packets that have different entropy label values. Based at least in part on the flow hash computed using the entropy value encoded in the probe, for example, three probe packets 126(1), 126(2), and 126(3) may be forwarded over Path A, and the other three probe packets 126(4), 126(5), and 126(6) may be forwarded over Path B. In this example scenario, probe packets 126 may be considered PT MPLS probes.

Figure 2A:
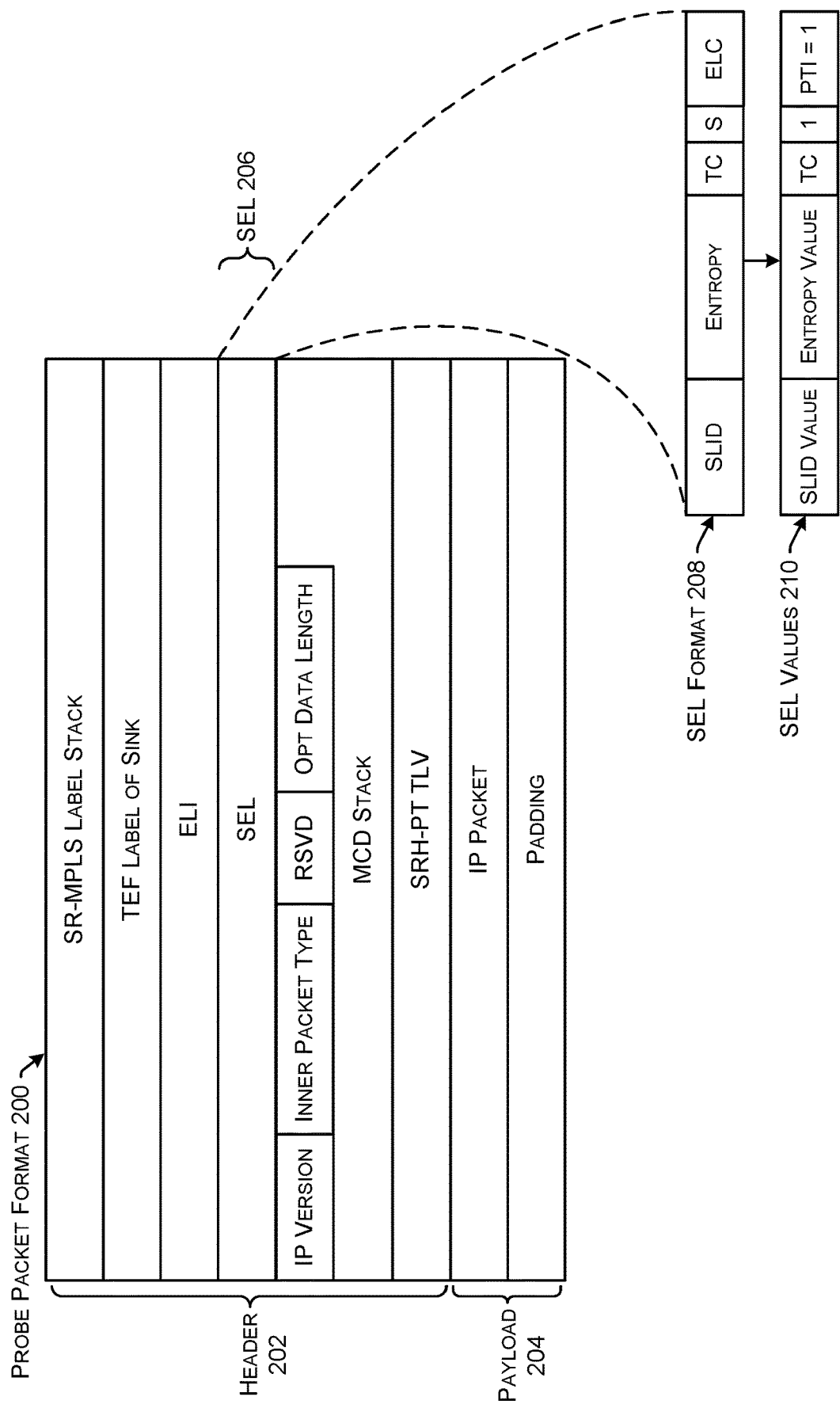
FIGS. 2A and 2B illustrate example probe packet formats that relate to the component diagrams illustrated in FIGS. 1A-1C. The example formats may be employed as part of communications between the example network devices illustrated in FIGS. 1A-1C, in accordance with the present concepts.
Figure 2B:
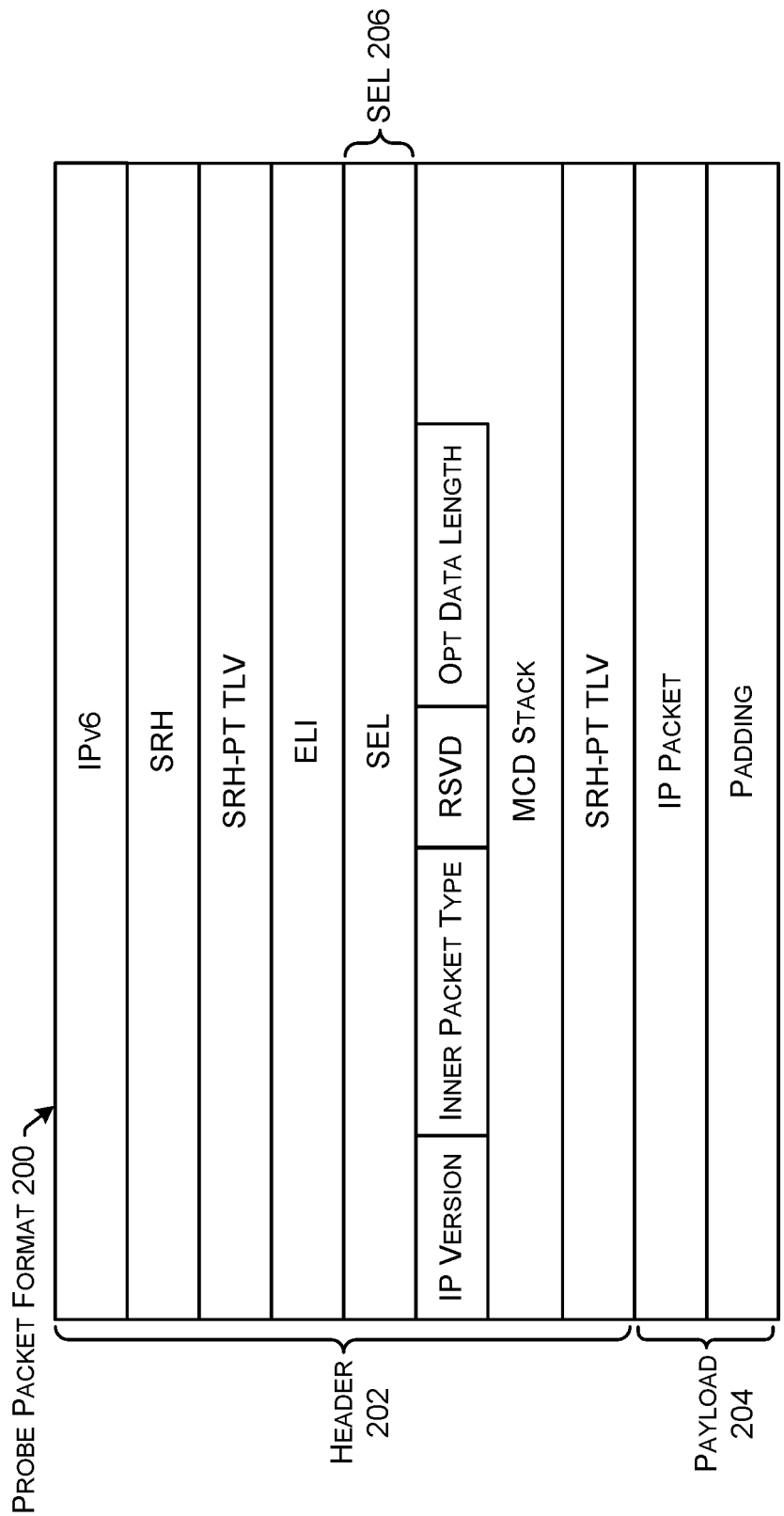

FIGS. 2A and 2B provide further detail regarding the example scenario introduced relative to FIGS. 1A-1C. FIGS. 2A and 2B collectively illustrate an example probe packet format 200. Example probe packet format 200 may be considered an example format of any of the probe packets 126 of environment 100. For instance, the format of probe packet 126(1), travelling Path A through network 102, may be represented by probe packet format 200. Probe packet format 200 may include and/or be based at least in part on some of the parameters that were identified by session configuration module 120, for instance. As described above, the parameters may have been provided by controller 112 to source node 106 for generation of the probe packets 126.

As illustrated by example probe packet format 200 in FIGS. 2A and 2B, a probe packet 126 may include header 202 portion and a payload 204 portion. The header 202 may be viewed as an MPLS encapsulation, for instance. Furthermore, header 202 may include SEL 206. FIG. 2A includes further detail regarding SEL 206, including an example SEL format 208 and example SEL values 210 which correspond to the example SEL format 208.

Example probe packet format 200 includes the following elements, shown on FIGS. 2A and/or 2B, but not specifically designated. Header 202 may include "SR-MPLS label stack," which may help transport a probe packet 126 from source node 106 to sink node 108. Header 202 may include "TEF Label of Sink" (e.g., TEF label), which may trigger a timestamp, encapsulate, and forward (TEF) SR TE policy and/or static route at sink node 108. Stated another way, the TEF label may trigger sink node 108 to send PT information to collector module 124. In some examples, the last SID for a probe packet 126 is the TEF label. Header 202 may further include an entropy label indicator (ELI) to indicate the presence of SEL 206 in the packet. SEL 206 may be the next label after the ELI, for instance.

SEL 206 may include several elements shown in SEL format 208 in FIG. 2A. For example, SEL 206 may include a slice identifier (SLID), which may carry a network slice ID. SEL 206 may include an entropy value. The entropy value(s) may be generated randomly and/or may be generated using any statistical approach. The entropy value may be chosen from the entropy sweeping range parameter of the PT session which was configured by controller 112, in some examples. In some implementations, the entropy value may be used at a midpoint node 110 for an ECMP hash calculation. SEL 206 may also specify a traffic class (TC). SEL 206 may include an "S" value to indicate a position of the SEL 206 in the header 202. For instance, setting S to 1 may indicate that SEL 206 is the bottom of the stack (BoS) label. The positioning of SEL 206 as the BoS label may help preserve the SEL 206 in a probe packet 126 as it travels across network 102 for PT purposes, described in more detail below. SEL 206 may also include entropy label control (ELC) bits. The ELC may carry a path tracking indicator (PTI) bit. In some examples, the PTI may be used to indicate the presence of the MPLS HbH-PT after the BoS label. The PTI may trigger PT behavior at a midpoint node 110, for instance.

Header 202 may further include a midpoint compressed data (MCD) stack. The MCD stack may be used to collect MCDs (e.g., interface-IDs) from PT-aware midpoint nodes 110. The MCD stack may include various elements, such as an internet protocol (IP) version, an inner packet type, a Reserved (RSVD) field, and an option data length. Note that additional or alternative elements, beyond those shown in FIGS. 2A and 2B, are contemplated for inclusion in the MDC stack. In some examples, the IP version may comprise 4 bits. The IP version may be set to a value of "0x4" for an IPv4 packet or "0x6" for a IPv6 packet. The IP version may also be set to another appropriate value, such as "0x0" for a control word, or "0x1" for a Generic Associated Channel (G-ACh), which may help to avoid incorrect hashing for ECMP when the IP header does not immediately follow the MPLS Label stack. The IP version may also be set to "0x2" to avoid a PT-unaware midpoint node from parsing a probe packet incorrectly. For instance, a midpoint node may try to parse a probe packet as an IPv4/IPv6 for finding the ECMP hash keys, or parsing 4-bytes after the BoS label as G-Ach. In some examples, the inner packet type may comprise 2 bits. The inner packet type may indicate a type of packet carried after the PT data (e.g., HbH-PT, plus SRH PT-TLV). The inner packet type may be used for use-case scenarios when applying customer packets. Example inner packet type field values may comprise "0" for no customer packet carried after the PT data, "1" for an L2 packet, "2" for an IPv4 packet, "3" for an IPv6 packet, etc. The reserved field may comprise 2 bits, for example, and may or may not be used, depending on the implementation. The option data length may be 8 bits, for instance. The option data length may carry a length of the MCD stack, in bytes. The option data length may be used by a PT-aware midpoint node to determine an MCD stack shift value, for instance. In some examples, the MPLS HbH-PT may have a fixed length of 44 bytes, of which the MCD stack may comprise 42 bytes (e.g., 14 MCDs). The MPLS HbH-PT may be a multiple of 4 bytes, and the MCD stack may be a multiple of 3 bytes, for instance. In some implementations, the structure of the HbH-PT option may differ between IPv6 and MPLS. For example, in IPv6 there may be type and length fields, where the type field is used as a trigger for the PT functionality at a midpoint node (i.e., IF HbH-PT, THEN perform PT midpoint behavior). However, in MPLS, the type field may not be needed and/or used, as the PT midpoint behavior may be triggered by the presence of the PTI flag in the ELC field of the SEL. Alternatively, the structure may be the same for IPv6 and MPLS if beneficial for reusing code.

Header 202 may also include a segment routing header (SRH)-PT type-length-value (TLV), which may be used to collect information regarding source node 106. Source node 106 may record its own data relevant to PT in the SRH-PT-TLV, such as an outgoing interface ID, outgoing interface load, transmit Tx timestamp, etc. The SRH-PT-TLV may be defined such that it can be leveraged across various data planes including MPLS, SR-MPLS, and SRv6.

FIGS. 2A and 2B also include a payload 204 portion of the example probe packet format 200. Payload 204 may represent additional elements that are carried in the probe packet 126 after the MPLS encapsulation. For instance, payload 204 in this example may include an IP packet and padding. The IP packet may represent the IP address of the source node 106, and may be added by the source node 106 after the MPLS encapsulation. The IP address of the source node 106 may be used by collector module 124 to identify the source node for the path tracing and entropy label values collected, for instance. Payload 204 may also include padding, which may be used to adjust any given probe packet 126 size as part of a maximum transmission unit (MTU) sweeping option. Note that the example probe packet format 200 provided in FIGS. 2A and 2B is provided for illustration purposes, and is not meant to be limiting. Other formats of a probe packet 126 are contemplated, with more or less elements arranged similarly or differently.

Source node 106 may generate many probe packets 126, as suggested above. The number of probe packets 126 generated may be based at least in part on the probe rate of the PT session, configured by the controller 112 (described above). The probe packets 126 will have different SEL values encoded in the entropy field of SEL 206. The different SEL values allow the multiple probe packets 126 to sweep over potentially all ECMP paths. The encoding of a probe packet 126 may take into account the following consideration in order to efficiently and successful perform path tracing and monitoring techniques. In some examples, source node 106 adds the TEF label before the ELI and SEL (FIG. 2A). Positioning of the TEF label before ELI/SEL may ensure that ELI/SEL are not the topmost labels in header 202. Stated another way, the TEF label will not be exposed as the top-most label until a probe packet 126 reaches sink node 108. The reason to not have ELI/SEL as topmost labels is to preserve ELI/SEL in probe packet 126 when probe packet 126 is forwarded to controller 112 from sink node 108. The entropy field of SEL 206 is used by controller 112 to create entropy-to-path mapping. Encoding the TEF label before the ELI/SEL labels may ensure that the ELI/SEL labels are not removed, or exposed as top labels by the penultimate node that may perform penultimate hop popping (PHP).

At "Step 4" of FIG. 1A, probe packets 126 may pass through midpoint nodes 110 in network 102. As suggested above, Path A and Path B may be considered simplistic examples of ECMP paths in a MPLS/SR-MPLS network. In other examples, there may be more midpoint nodes in between any given source node and sink node pair, for instance. Step 4 may represent a variety of functions performed by any midpoint node 110 relative to a probe packet 126 as part of a PT session. For example, a midpoint node 110 may use the entropy value in the entropy field of SEL 206 (FIG. 2A) to compute an ECMP hash and decide an ECMP path (e.g., outgoing interface). A midpoint node 110 may check whether the PTI flag in ELC in the SEL 206 is set. If the PTI flag is set, midpoint node 110 may write its MCD (e.g., outgoing interface ID, outgoing interface load, truncated transmit Tx timestamp) in the MCD stack of probe packet 126. Note that the ELI/SEL labels may not be removed by a midpoint node 110, as a result of encoding the ELI/SEL labels after the TEF label (described above).

In some examples, the midpoint node 110 may receive a probe packet and use the entropy value in the probe packet to compute an ECMP hash to decide the ECMP Path (i.e., Outgoing Interface). In some instances, the midpoint node 110 may decide to drop the probe packet because the TTL has expired due to a forwarding loop. The midpoint node 110 may decide to drop a probe packet because of another reason, such as QoS tail-drop, ACL match or FIB table lookup failure, L2 Adj (ARP) issue, L2 header issue, DOS/Security attack, etc. If this is the case, the midpoint node 110 may use the forwarding entry in the FIB table for the TEF behavior programmed by the controller, to forward the dropped probe packet (e.g., in fast forwarding data path) to the collector module 124. The TEF behavior may overwrite the midpoint node probe packet drop action, in this case. The midpoint node 110 may encapsulate the dropped probe packet with an outer IPv6 header with Segment Routing Header and SRH-PT TLV, for example, and may forward the encapsulated probe packet in the fast forwarding data path to the controller 112. In an example scenario, the midpoint node 110 may leverage the SRH PT-TLV of the encapsulation added by the TEF behavior to encode additional information, such as reason for TEF behavior trigger (e.g., No Next-Hop match found in FIB). The controller 112 may use the information in TLV to help troubleshoot the packet loss issue promptly.

At "Step 5" of FIG. 1B, the probe packets 126 arrive at sink node 108 via a variety of paths across network 102. Step 5 may represent execution of a timestamp, encapsulate, and forward (TEF) function performed by sink node 108 on probe packets with a TEF label. Stated another way, the TEF behavior may be triggered by the MPLS TEF label. In some examples, TEF behavior may include encapsulation of the probe packet 126 with a new or partially rewritten header. For example, sink node 108 may encapsulate probe packet 126 with a new IPv6/SRv6 header. Step 5 may further represent forwarding of the probe packets 126 to the controller 112. The probe packets 126 may be forwarded in a data path, such as a fast forwarding path, without punting the probe packet 126 to the control-plane.

FIG. 2B illustrates example probe packet format 200 after encapsulation by sink node 108 in the example PT session scenario. As shown in FIG. 2B, header 202 includes new elements relative to FIG. 2A, and some elements have been removed from header 202. For example, sink node 108 has added an IPv6 header, SRH, and SRH-PT TLV. Note that the SRH-PT TLV shown under the MCD stack in header 202 in FIG. 2B recorded information from source node 106. The new SRH-PT TLV added by sink node 108 records PT data (e.g., incoming interface ID, incoming interface load and receive Rx timestamp) of the sink node 108. Sink node 108 may also propagate an application label (e.g., service label), including L3VPN and EVPN labels, for instance, by the data plane (in fast path) to controller 112 to be able to monitor a particular service and/or the ECMP path taken by the service. In some examples, the TEF behavior may ensure that addition of any new encapsulation does not remove existing MPLS headers, particularly ELI/SEL, from the received packet.

At "Step 6" of FIG. 1B, controller 112, using collector module 124, collects probe packets 126 from sink node 108. Analyzer 118 may analyze information from probe packets 126 to discover the ECMP paths. For instance, analyzer may examine interface IDs received in the MCD stacks of the probe packets to discover a path across network 102 travelled by a particular probe packet 126. Analyzer may also use other information, such as details in SEL 206 (e.g., SLID, entropy label control flags in the entropy label) for further discovering and monitoring paths in the network. Additionally, the TTL and/or traffic class (TC) fields contained in ELI and/or SEL 206 may be used by controller 112 to detect any issue with an ECMP path for a given traffic class and/or number of hops, for instance. Finally, analyzer 118 may create an entropy-to-path mapping, linking the entropy value in an SEL 206 of a particular probe packet 126 and save the mapping in the mapping database 116.

At "Step 7" of FIG. 1C, controller 112, using probe optimizer 114, may compute a new list of entropy values to place in subsequent probe packets 128. For example, probe optimizer 114 may access mappings stored in mapping database 116 in order to determine the list of entropy values. As such, probe optimizer 114 is able to benefit from the discovered paths from the PT session described relative to Steps 1-6. Probe optimizer 114 may therefore be able to choose only the entropy values that are mapped to a particular path across network 102, to be able to monitor potentially all of the available ECMP paths while avoiding the generation of excess probe packets. For instance, rather than sweeping all entropy values between 8 and 8192, probe optimizer 114 may select specific entropy values for which there is a entropy-to-path mapping in mapping database 116 (e.g., 256, 1000, 1300, 1558, etc.). Note that FIG. 1A depicts only one subsequent probe packet 128 traversing each of Path A and Path B across network 102, which is intended to suggest the improved efficiency afforded by the entropy-to-path mappings, in this example scenario.

At "Step 8," controller 112 may instruct source node 106 to generate subsequent probe packets 128, using the entropy label values determined by probe optimizer 114. Stated another way, controller 112 leverages the entropy-to-path mappings to re-provision source node 106 to generate a new, lower number (potentially a minimum or optimized number) of probe packets to monitor detected paths in network 102. Many aspects of Step 8 may be similar to Step 3 of FIG. 1A, such as the use of parameters provided by controller 112 in the generation of the subsequent probe packets 128. Additionally, counterparts to Steps 4-6 may also be performed relative to subsequent probe packets 128, although not described in detail here for sake of brevity. In some examples, once subsequent probe packets 128(1) and 128(2) are received at collector module 124, controller 112 may use information in subsequent probe packets 128 to monitor performance and/or operation of network 102. For instance, controller 112 may compare the paths travelled by subsequent probe packets 128 to the paths travelled by probe packets 126. Such a comparison by controller 112 may show a forwarding failure in network 102, in some cases. Furthermore, controller 112 may continue to monitor network 102 by continuing to generate, collect, and analyze probe packets, repeating many of the Steps described in FIGS. 1A-1C.

Various additional advantages have been identified for the path detection and monitoring techniques described herein. For instance, a controller may be able to monitor a network using a same ECMP that is also being used by a customer data flow. The techniques are backwards compatible on existing midpoint nodes, and therefore may be deployed in an existing network. The techniques may work seamlessly in a variety of use-case scenarios, such as network slicing. In instances where packets already include an ELI/EL, the present techniques may not affect a maximum label stack depth, which may be a limitation of other platforms. The present techniques may work for all MPLS networks, including segment routing and ethernet virtual private network (EVPN), for instance. Finally, since the sink node propagates a probe packet to a controller in data plane (e.g., fast forwarding path) in some examples, the sink node control plane is not adversely taxed.

To summarize, path detection and monitoring techniques may be used to trace an actual path that a packet takes between any two nodes in a network (point A to point Z). The techniques may be used to measure the end-to-end delay from A to Z, measure the per-hop delay at each node on the path from A to Z, and/or detect the load on each router that forwards the packet from A to Z. The techniques may potentially provide detection of all ECMP paths in an MPLS network. Furthermore, the techniques provide a mechanism to improve (e.g., lower) and potentially optimize a number of probes sent for monitoring the ECMP paths by leveraging mapped entropy values.

Figure 3:
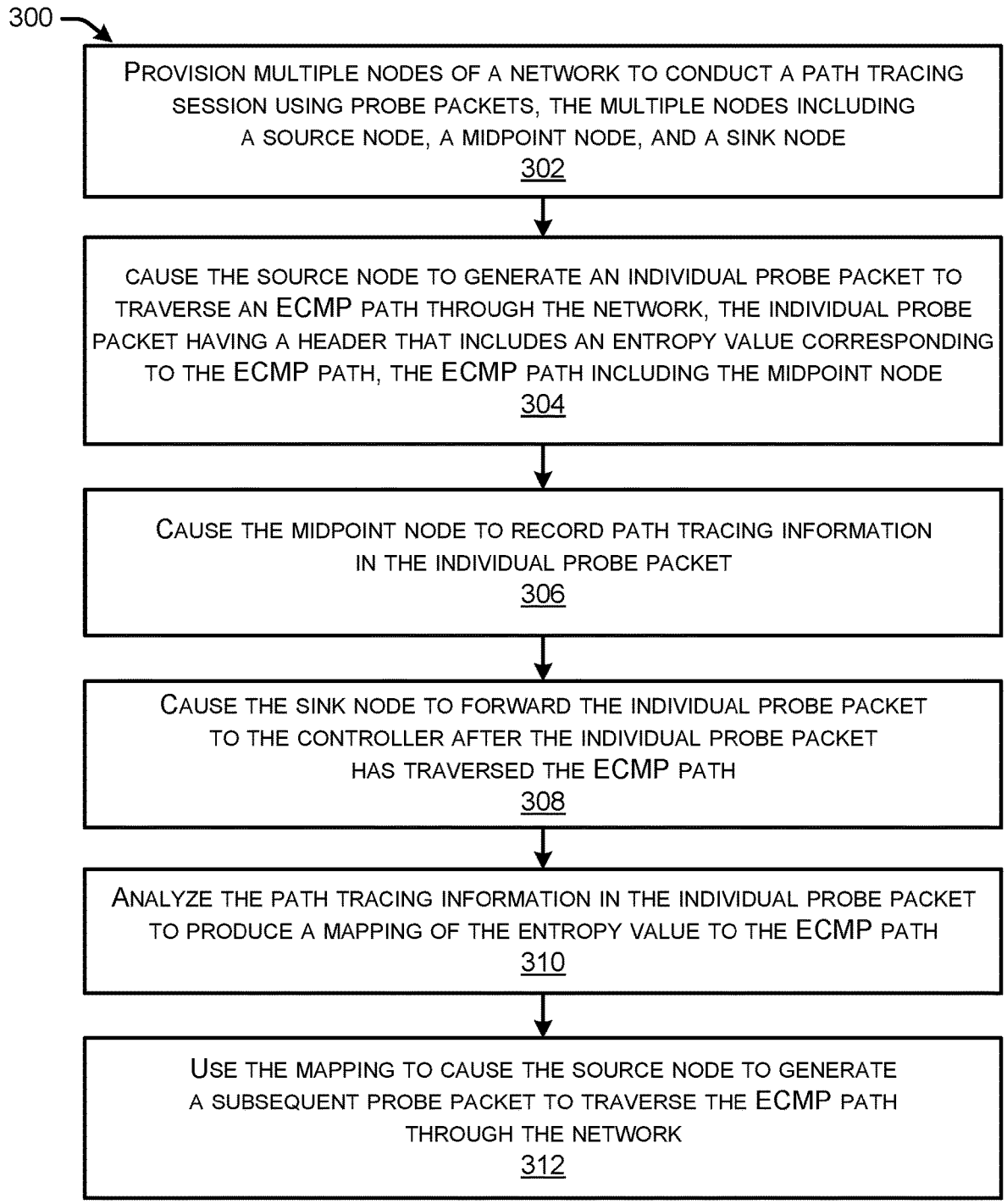
FIGS. 3 and 4 illustrate flow diagrams of example methods for path detection and monitoring as a part of communications among network devices, in accordance with the present concepts.
Figure 4:
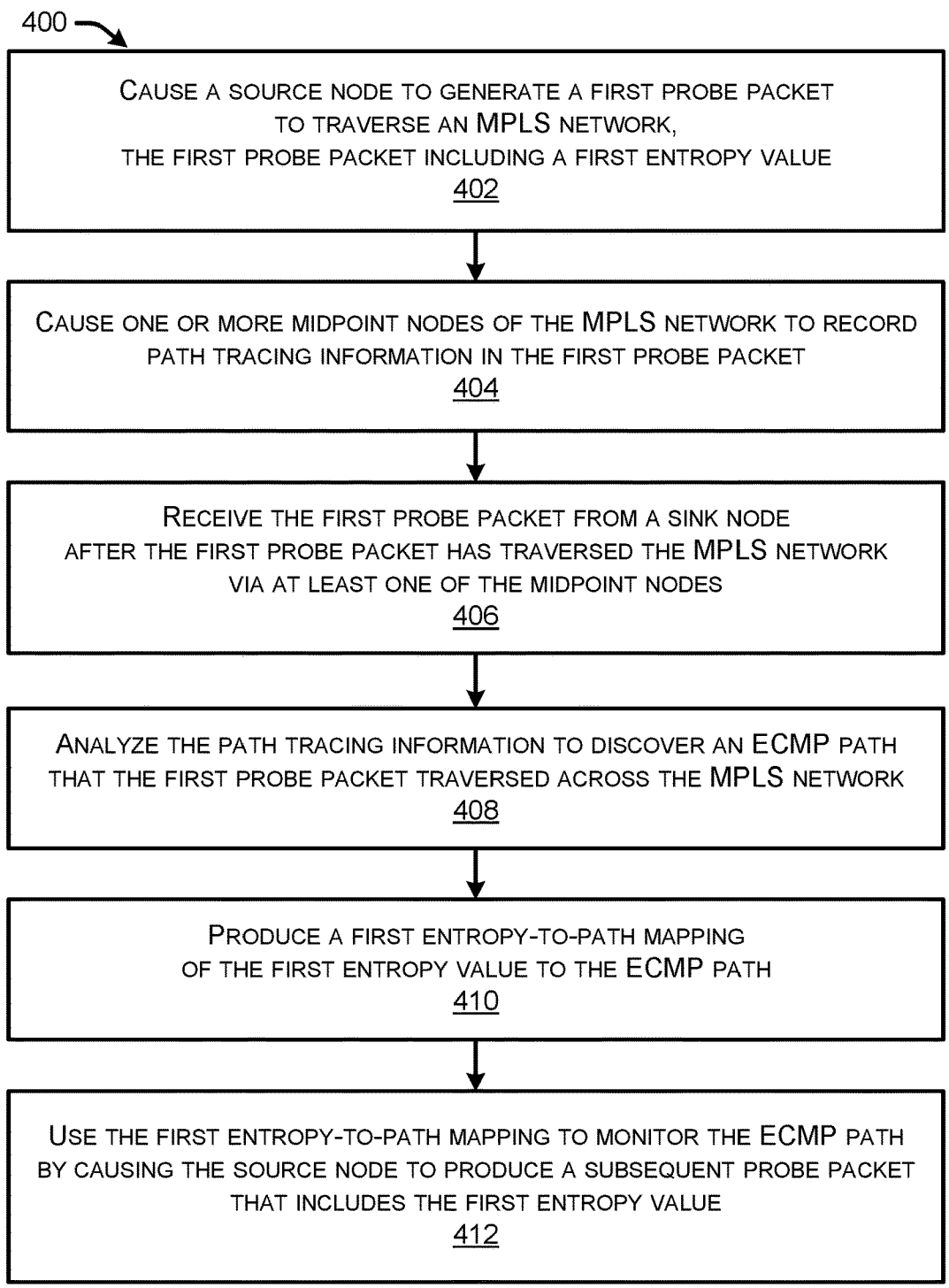

FIGS. 3 and 4 illustrate flow diagrams of example methods 300 and 400 that include functions that may be performed at least partly by a network device, such as controller 112 described relative to FIGS. 1A-1C. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3 and 4 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 3 illustrates a flow diagram of an example method 300 for one or more network devices to perform path detection and monitoring techniques. Method 300 may be performed by a controller (e.g., controller 112) communicatively coupled to devices of a network, including a source node (e.g., source node 106) and a sink node (e.g., sink node 108), for instance. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include provisioning, by a controller, multiple nodes of a network. For example, the controller may provision the nodes to conduct a path tracing session using probe packets. The multiple nodes may include one or more source nodes, one or more sink nodes, and/or one or more midpoint nodes. The path tracing session may be designed to discover paths of the network, such as multiple paths that may be available and/or used between any given source node and sink node pair, and which may include midpoint nodes. Provisioning the multiple nodes may include provisioning the sink node to generate the probe packets, provisioning the sink node to be able to forward the probe packets back to the controller, and/or provisioning midpoint nodes of the network to participate in the path tracing session. In some examples, provisioning the multiple nodes may include programming and/or providing instructions to various nodes in the network, including at least one source node, at least one midpoint node, additional midpoint nodes, and at least one sink node. For instance, provisioning the nodes may include steps 304, 306, and/or 308 of method 300, described below.

At 304, method 300 may include causing the source node to generate an individual probe packet to traverse an equal-cost multi-path (ECMP) path through the network. In some examples, the individual probe packet may have a header that includes an entropy value corresponding to the ECMP path. In some examples, the entropy value may be included in an entropy label located in a multi-protocol label switching (MPLS) label stack in the header of the probe packet. The header of the probe packet may further include an entropy label indicator (ELI). The entropy value may be located after the ELI. Method 300 may further include causing the source node to place a timestamp, encapsulate, and forward (TEF) label in the probe packet. The TEF label may trigger the sink node to return the probe packet to the controller, for instance. In some examples, the sink node may return the probe packet to the controller in fast forwarding path, without punting the probe packet to the local slow path or control plane.

At 306, method 300 may include causing the midpoint node to record path tracing information in the probe packet. For instance, the ECMP path may include the source node, the sink node, and at least one midpoint node. In order to discover which nodes the probe packet traversed, the controller may send instructions to the midpoint nodes in the network to record path tracing information, such as an interface ID, in the probe packet as it passes the node. In some examples, one or more midpoint nodes may be provisioned to handle a scenario in which a packet is dropped. For instance, a midpoint node may be provisioned to forward a dropped packet to the controller. A second TEF label in the packet may trigger the midpoint node to forward the dropped packet to the controller, in some cases.

At 308, method 300 may include causing the sink node to forward the probe packet to the controller after the probe packet has traversed the ECMP path. In some examples, the probe packet may be received from the sink node in response to the TEF label placed in the probe packet by the source node.

At 310, method 300 may include analyzing the path tracing information in the probe packet to discover the ECMP path. The analysis may include examining interface IDs received in the probe packet to discover the ECMP path. The analysis may also produce a mapping of the entropy value to the ECMP path.

At 312, method 300 may include using the mapping to cause the source node to generate a subsequent probe packet to traverse the ECMP path through the network. For instance, the controller may send the entropy value specified in the mapping to the source node to place in the subsequent probe packet, triggering transmission of the subsequent probe packet via the same ECMP path.

Furthermore, method 300 may include reducing, or optimizing, a number of additional probe packets sent via the ECMP path by selecting the mapping of the entropy value to the ECMP path from a set of additional mappings that include additional entropy values mapped to the ECMP path. Only the entropy value of the selected mapping, and not the additional entropy values, may then be sent to the source node for generation of the subsequent probe packet.

In some implementations, method 300 may represent a solution for detecting and monitoring ECMP paths in MPLS/SR-MPLS networks. As such, method 300 may provide a mechanism to sweep (potentially) all ECMP paths. Method 300 may provide a mechanism to ensure the SEL is not removed from the MPLS header by any midpoint and/or sink nodes in the network. Method 300 may include behavior on the sink node to propagate the SEL to the collector/controller along with a new IPv6/SRv6 encapsulation. Method 300 may provide a mechanism to indicate to the collector/controller that a probe packet contains an MPLS header and/or an SEL. Method 300 may further provide a mechanism by which the controller may use the SELs of identified ECMP paths to monitor the ECMP paths, as opposed to continuing to sweep a larger entropy value range or list. Finally, method 300 may provide for a controller to store mappings of entropy values to discovered paths, for future reference.

FIG. 4 illustrates a flow diagram of an example method 400 for one or more network devices to perform path detection and monitoring techniques. Method 400 may be performed by a controller (e.g., controller 112) communicatively coupled to devices of a network, including a source node (e.g., source node 106) and a sink node (e.g., sink node 108), for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include causing a source node to generate a first probe packet to traverse a multi-protocol label switching (MPLS) network. In some examples, the first probe packet may include a first entropy value. Method 400 may further include causing the source node to place the first entropy value below a timestamp, encapsulate, and forward (TEF) label in a header of the first probe packet. The TEF label may be associated with and/or may reference the sink node. In this example, a midpoint node may not remove the first entropy value before the first probe packet arrives at the sink node. Therefore, the first entropy value will remain intact in the first probe packet.

At 404, method 400 may include causing one or more midpoint nodes of the MPLS network to record path tracing information in the first probe packet. For instance, the controller may send instructions to the midpoint nodes in the network to record path tracing information, such as an interface ID, in the first probe packet as it passes a midpoint node.

At 406, method 400 may include receiving the first probe packet from a sink node. The first probe packet may be received from the sink node after the first probe packet has traversed the MPLS network via at least one of the midpoint nodes, for instance.

At 408, method 400 may include analyzing the path tracing information to discover an equal-cost multi-path (ECMP) path that the first probe packet traversed across the MPLS network. Stated another way, the controller may not have knowledge of an ECMP path that a probe packet will traverse given a particular entropy value. After analysis of a returned probe packet, the controller may be able to learn to which ECMP path a particular entropy value corresponds.

At 410, method 400 may include producing a first entropy-to-path mapping of the first entropy value to the ECMP path. The mapping may be stored in a database accessible to the controller. The database may contain other entropy-to-path mappings relevant to the MPLS network.

At 412, method 400 may include using the first entropy-to-path mapping to monitor the ECMP path by causing the source node to produce a subsequent probe packet that includes the first entropy value. For instance, in order to monitor the ECMP path, the controller may look up the particular entropy value that corresponds to the ECMP path by accessing the entropy-to-path mapping.

In some examples, method 400 may further include causing the source node to generate a second probe packet to traverse the MPLS network, the second probe packet including a second entropy value. Method 400 may include receiving the second probe packet from the sink node after the second probe packet has traversed the MPLS network. In method 400, the controller may also analyze second path tracing information to produce a second entropy-to-path mapping that includes the second entropy value. For instance, midpoint nodes may have record second path tracing information in the second probe packet as it traversed the MPLS network. Analysis may further include determining that the first probe packet and the second probe packet traversed a same ECMP path across the MPLS network. In order to reduce a subsequent amount of probe packets generated to monitor the MPLS network, the controller may select either the first entropy value or the second entropy value, since both the first and second entropy values triggered transmission of the respective probe packets across the same ECMP path. The selected entropy value may then be provided to the source node for the subsequent probe packet.

Figure 5:
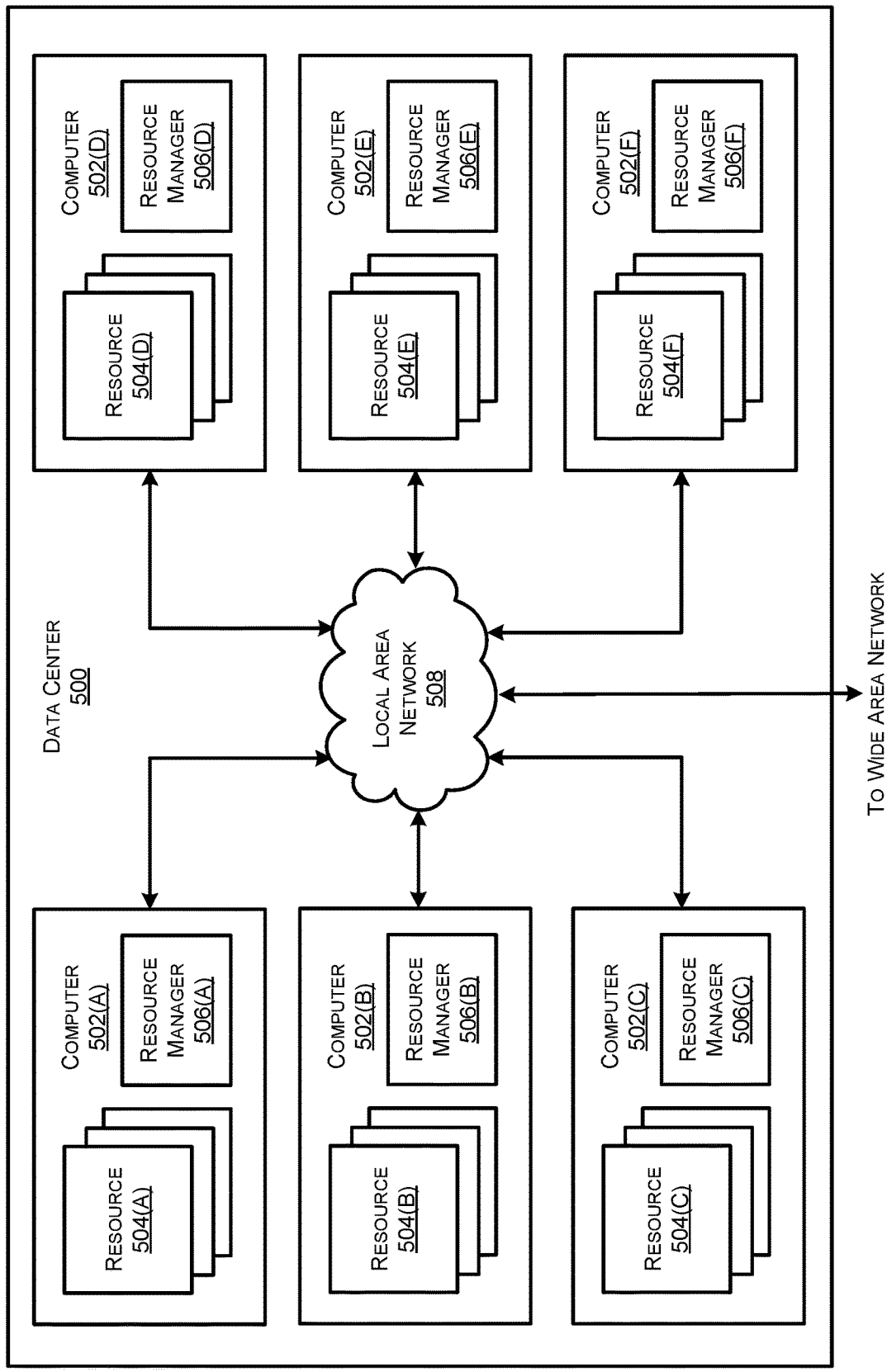
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several computers 502A-502F (which might be referred to herein singularly as "a computer 502" or in the plural as "the computers 502") for providing computing resources. In some examples, the resources and/or computers 502 may include, or correspond to, any type of networked device described herein, such as server(s) 104, controller 112, source node 106, sink node 108, and/or midpoint nodes 110. Although, computers 502 may comprise any type of networked device, such as servers, switches, routers, hubs, bridges, gateways, modems, repeaters, access points, hosts, etc.

The computers 502 can be standard tower, rack-mount, or blade server computers configured appropriately for providing computing resources. In some examples, the computers 502 may provide computing resources 504 including data processing resources such as virtual machine (VM) instances or hardware computing systems, database clusters, computing clusters, storage clusters, data storage resources, database resources, networking resources, and others. Some of the computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer 502. Computers 502 in the data center 500 can also be configured to provide network services and other types of services.

In the example data center 500 shown in FIG. 5, an appropriate local area network (LAN) 508 is also utilized to interconnect the computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the computers 502A-502F in each data center 500, and, potentially, between computing resources in each of the computers 502. It should be appreciated that the configuration of the data center 500 described with reference to FIG. 5 is merely illustrative and that other implementations can be utilized.

In some examples, the computers 502 may each execute one or more application containers and/or virtual machines to perform techniques described herein. For instance, the containers and/or virtual machines may serve as server devices, user devices, and/or routers in the cloud computing network 102.

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regards to FIG. 6.

Figure 6:
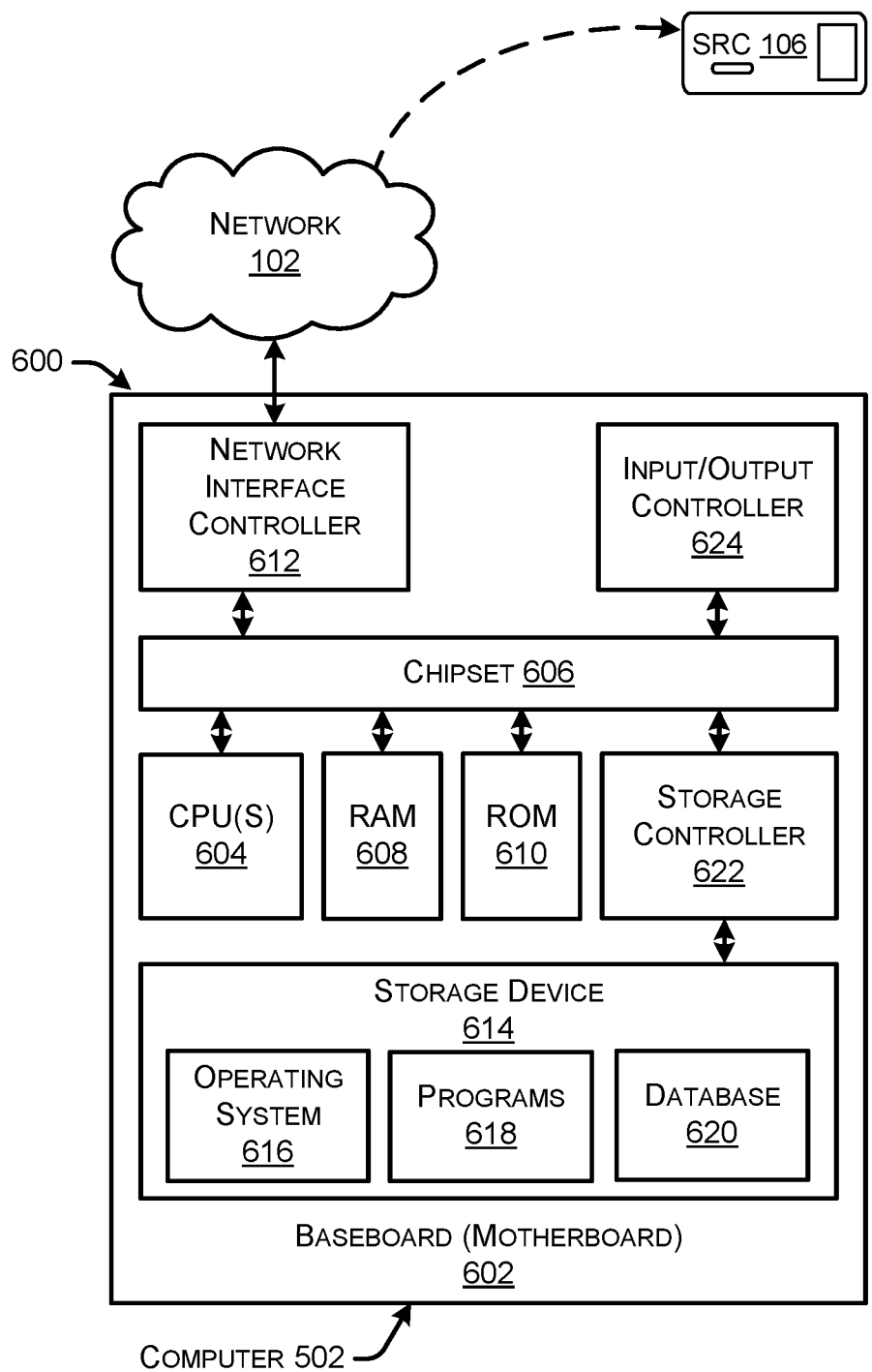
FIG. 6 is a computer architecture diagram showing an illustrative computer hardware architecture for implementing a device that can be utilized to implement aspects of the various technologies presented herein.

FIG. 6 shows an example computer architecture 600 for a computer 502 capable of executing program components for implementing the functionality described above. The computer architecture 600 shown in FIG. 6 illustrates a conventional server computer, workstation, desktop computer, laptop, tablet, network appliance, e-reader, smartphone, and/or other computing device, and can be utilized to execute any of the software components presented herein. The computer 502 may, in some examples, correspond to a physical device described herein (e.g., server(s) 104, source node 106, sink node 108, midpoint nodes 110), and may comprise networked devices such as servers, switches, routers, hubs, bridges, gateways, modems, repeaters, access points, etc. For instance, computer 502 may correspond to controller 112.

As shown in FIG. 6, the computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as networks 102 and/or 508. The chipset 606 can include functionality for providing network connectivity through a network interface controller (NIC) 612, such as a gigabit Ethernet adapter. The NIC 612 is capable of connecting the computer 502 to other computing devices over the network 102. For instance, in the example shown in FIG. 6, NIC 612 may help facilitate transfer of data, packets, and/or communications, such as parameters related to provisioning of a PT session, over the network 102 to source node 106. It should be appreciated that multiple NICs 612 can be present in the computer 502, connecting the computer to other types of networks and remote computer systems.

The computer 502 can be connected to a storage device 614 that provides non-volatile storage for the computer. The storage device 614 can store an operating system 616, programs 618, a database 620 (e.g., mapping database 116), and/or other data. The storage device 614 can be connected to the computer 502 through a storage controller 622 connected to the chipset 606, for example. The storage device 614 can consist of one or more physical storage units. The storage controller 622 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 614 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 614 is characterized as primary or secondary storage, and the like.

For example, the computer 502 can store information to the storage device 614 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 614 by detecting the physical states or characteristics of one or more particular locations within the physical storage units.

In addition to the mass storage device 614 described above, the computer 502 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 502. In some examples, the operations performed by the network 102, and or any components included therein, may be supported by one or more devices similar to computer 502. Stated otherwise, some or all of the operations performed by the network 102, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 614 can store an operating system 616 utilized to control the operation of the computer 502. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 614 can store other system or application programs and data utilized by the computer 502.

In one embodiment, the storage device 614 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regards to FIGS. 1A-4. The computer 502 can also include computer-readable storage media having instructions stored thereupon for performing any of the other computer-implemented operations described herein.

The computer 502 can also include one or more input/output controllers 624 for receiving and processing input from a number of input devices, such as a keyboard, a mouse, a touchpad, a touch screen, an electronic stylus, or other type of input device. Similarly, an input/output controller 624 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the computer 502 may comprise one or more devices, such as server(s) 104, controller 112, source node 106, sink node 108, midpoint nodes 110, and/or other devices. The computer 502 may include one or more hardware processors 604 (processors) configured to execute one or more stored instructions. The processor(s) 604 may comprise one or more cores. Further, the computer 502 may include one or more network interfaces configured to provide communications between the computer 502 and other devices, such as the communications described herein as being performed by controller 112, source node 106, sink node 108, midpoint nodes 110, and/or other devices. In some examples, the communications may include data, packet, request, acknowledgment, PT session parameters, instructions, probes, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 618 may comprise any type of programs or processes to perform the techniques described in this disclosure in accordance with path detection and monitoring techniques. For instance, the programs 618 may cause the computer 502 to perform techniques for communicating with other devices using any type of protocol or standard usable for determining connectivity. Additionally, the programs 618 may comprise instructions that cause the computer 502 to perform the specific techniques for the detection and/or monitoring of network paths.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
provisioning, by a controller, multiple nodes of a network to conduct a path tracing session using probe packets, the multiple nodes including a source node, a midpoint node, and a sink node, the provisioning including:
causing the source node to generate an individual probe packet to traverse an equal-cost multi-path (ECMP) path through the network, the individual probe packet having a timestamp, encapsulate, and forward (TEF) label and a header that includes an entropy value corresponding to the ECMP path, the ECMP path including the midpoint node,
causing the midpoint node to record path tracing information in the individual probe packet, and
causing the sink node to forward the individual probe packet to the controller in response to the TEF label after the individual probe packet has traversed the ECMP path;
analyzing the path tracing information in the individual probe packet to produce a mapping of the entropy value to the ECMP path; and
using the mapping to cause the source node to generate a subsequent probe packet to traverse the ECMP path through the network.

2. The computer-implemented method of claim 1, wherein the entropy value is included in an entropy label located in a multi-protocol label switching (MPLS) label stack in the header of the individual probe packet.

3. The computer-implemented method of claim 1, wherein provisioning the multiple nodes includes provisioning additional midpoint nodes of the network to participate in the path tracing session.

4. The computer-implemented method of claim 1, further comprising:
reducing a number of additional probe packets sent via the ECMP path by selecting the mapping of the entropy value to the ECMP path from a set of additional mappings that include additional entropy values mapped to the ECMP path; and sending the entropy value of the selected mapping to the source node for generation of the subsequent probe packet.

5. The computer-implemented method of claim 1, wherein the path tracing information includes at least one interface ID recorded in the individual probe packet by the midpoint node.

6. The computer-implemented method of claim 1, further comprising:
causing the source node to generate a second individual probe packet to traverse the ECMP path, the second individual probe packet having a second TEF label,
wherein the second individual probe packet is dropped at the midpoint node, becoming a dropped probe packet.

7. The computer-implemented method of claim 6, wherein the individual probe packet is received from the sink node in response to the TEF label placed in the individual probe packet by the source node.

8. The computer-implemented method of claim 6, further comprising:
provisioning the midpoint node to forward the dropped probe packet to the controller in response to the second TEF label in the dropped probe packet.

9. A computing device comprising:
one or more processors; and
one or more non-transitory computer-readable media storing computer-executable instructions that, when executed by the one or more processors, cause the one or more processors to:
provision multiple nodes of a network to conduct a path tracing session using probe packets, the multiple nodes including a source node, a midpoint node, and a sink node, provisioning the multiple nodes including:
causing the source node to generate an individual probe packet to traverse an equal-cost multi-path (ECMP) path through the network, the individual probe packet having a timestamp, encapsulate, and forward (TEF) label and a header that includes an entropy value corresponding to the ECMP path,
causing the midpoint node to record path tracing information in the individual probe packet, and
causing the sink node to forward the individual probe packet to the computing device in response to the TEF label after the individual probe packet has traversed the ECMP path;
analyze the path tracing information in the individual probe packet to produce a mapping of the entropy value to the ECMP path; and
use the mapping to cause the source node to generate a subsequent probe packet to traverse the ECMP path through the network.

10. The computing device of claim 9, wherein the entropy value is included in an entropy label located after a multi-protocol label switching (MPLS) label stack in the header of the individual probe packet.

11. The computing device of claim 9, wherein provisioning the multiple nodes includes provisioning additional midpoint nodes of the network to participate in the path tracing session.

12. The computing device of claim 9, wherein the computer-executable instructions further cause the one or more processors to:
reduce a number of additional probe packets sent via the ECMP path by selecting the mapping of the entropy value to the ECMP path from a set of additional mappings that include additional entropy values mapped to the ECMP path; and send the entropy value of the selected mapping to the source node for generation of the subsequent probe packet.

13. The computing device of claim 9, wherein analyzing the path tracing information includes at least one interface ID recorded in the individual probe packet by the midpoint node.

14. The computing device of claim 9, wherein the computer-executable instructions further cause the one or more processors to:
provision the midpoint node to forward a dropped probe packet to the computing device.

15. The computing device of claim 14, wherein the individual probe packet is received from the sink node in response to the TEF label placed in the individual probe packet by the source node.

16. The computing device of claim 14, wherein provisioning the multiple nodes further includes:
provision the midpoint node to forward the dropped probe packet to the computing device in response to a respective TEF label of the dropped probe packet.

17. A method comprising:
causing a source node to generate a first probe packet to traverse a multi-protocol label switching (MPLS) network, the first probe packet including a first entropy value;
causing one or more midpoint nodes of the MPLS network to record path tracing information in the first probe packet responsive to a timestamp, encapsulate, and forward (TEF) label of the first probe packet;
receiving the first probe packet from a sink node after the first probe packet has traversed the MPLS network via at least one of the midpoint nodes;
analyzing the path tracing information to discover an equal-cost multi-path (ECMP) path that the first probe packet traversed across the MPLS network;
producing a first entropy-to-path mapping of the first entropy value to the ECMP path; and
using the first entropy-to-path mapping to monitor the ECMP path by causing the source node to produce a subsequent probe packet that includes the first entropy value.

18. The method of claim 17, further comprising:
causing the source node to generate a second probe packet to traverse the MPLS network, the second probe packet including a second entropy value;
receiving the second probe packet from the sink node after the second probe packet has traversed the MPLS network; and
analyzing second path tracing information of the second probe packet to produce a second entropy-to-path mapping that includes the second entropy value.

19. The method of claim 18, further comprising:
determining that the first probe packet and the second probe packet traversed a same ECMP path across the MPLS network; and
selecting one of the first entropy value from the first probe packet or the second entropy value from the second probe packet to provide to the source node for the subsequent probe packet.

20. The method of claim 17, further comprising:
causing the source node to place the first entropy value below the TEF label in a header of the first probe packet such that the at least one of the midpoint nodes does not remove the first entropy value before the first probe packet arrives at the sink node.

* * * * *